UNITED STATES PATENT OFFICE.

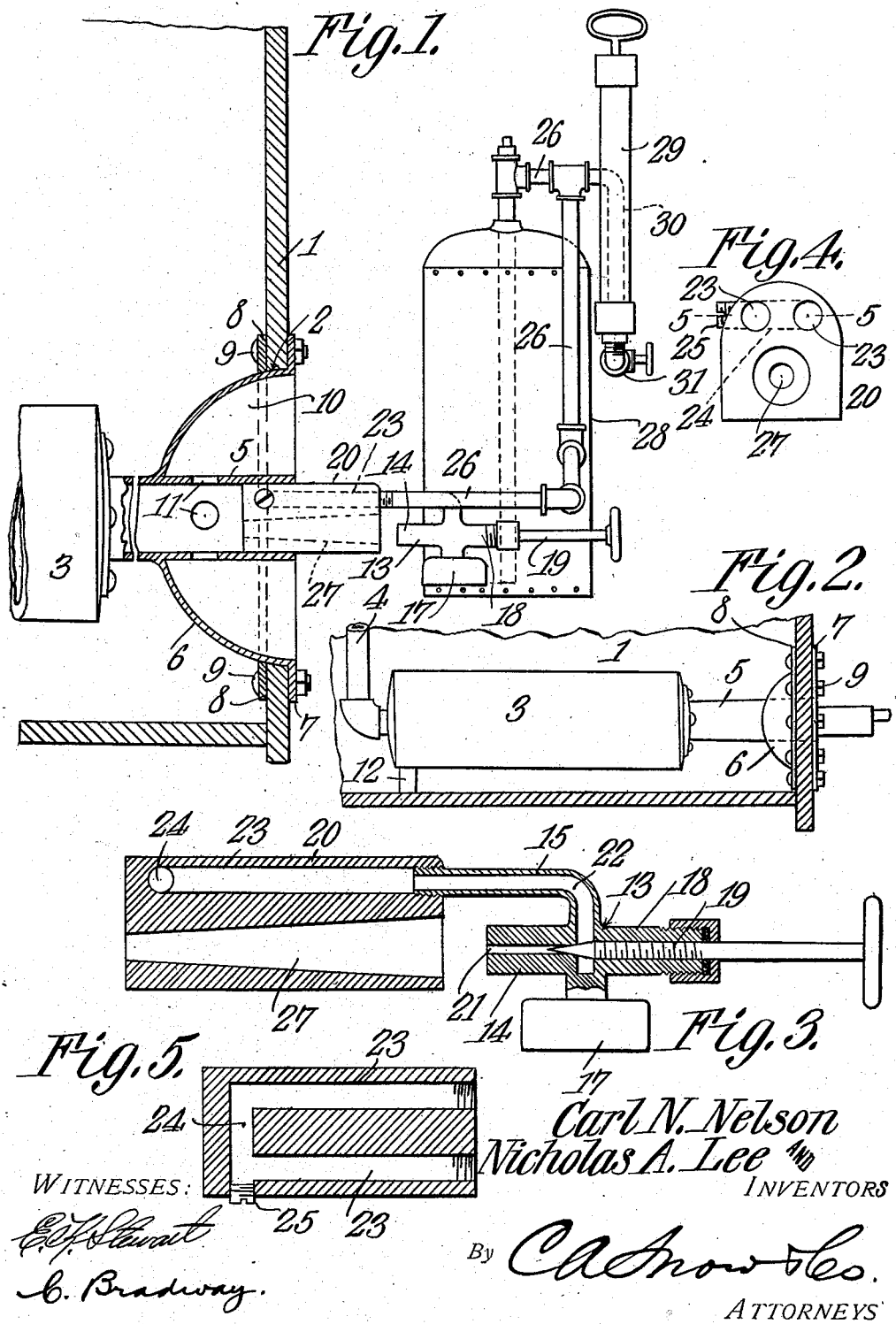

CARL N. NELSON AND NICHOLAS A. LEE, OF COLFAX, WISCONSIN.

WATER-HEATER.

No. 900,873.  Specification of Letters Patent.  Patented Oct. 13, 1908.

Application filed February 4, 1907. Serial No. 355,649.

*To all whom it may concern:*

Be it known that we, CARL N. NELSON and NICHOLAS A. LEE, citizens of the United States, residing at Colfax, in the county of Dunn and State of Wisconsin, have invented a new and useful Water-Heater, of which the following is a specification.

This invention relates to a heater of that type adapted for use in connection with water tanks or troughs for live stock in which a burner arranged exterior to the tank directs a flame into a drum submerged in the tank whereby the water is heated to the desired temperature for preventing the formation of ice.

The invention has for one of its objects to improve and simplify the construction and operation of devices of this character so as to be comparatively easy and inexpensive to manufacture, reliable and efficient in use, and convenient to manipulate.

With these objects in view, and others, as will appear as the nature of the invention is better understood, the invention comprises the various novel features of construction and arrangement of parts, which will be more fully described hereinafter, and set forth with particularity in the claims appended hereto.

In the accompanying drawing, which illustrates one embodiment of the invention, Figure 1 is a vertical sectional view of a portion of a water tank with the heater applied thereto. Fig. 2 is a similar view showing the heating drum of the system. Fig. 3 is a vertical longitudinal section of the burner. Fig. 4 is a front view of the combined vaporizer and mixing or ejector chamber. Fig. 5 is a horizontal section on line 5—5 of Fig. 4.

Corresponding parts in the several figures are indicated throughout by similar characters of reference.

Referring to the drawing, 1 designates a water tank, which may be of any approved construction, and in its vertical wall is provided an opening 2 located adjacent the bottom of the tank. Submerged in the tank is a heating drum or combustion chamber 3 into which the burner discharges its flame, an exhaust pipe 4 being employed for conveying off the spent gases from the drum 3 to the atmosphere at any desired point. The exhaust pipe 4 is connected with one of the heads of the drum 3, and to the opposite head is secured an induction pipe 5 through which the burner flame is directed. This pipe, which is bolted or otherwise suitably secured to the drum, is cast or otherwise provided with a hollow semi-spherical or cup-shaped member 6 that is fitted in the opening 2 of the tank and formed with a transversely extending annular rim 7 which bears against the outer surface of the tank. Bearing against the inner surface of the tank, adjacent the opening 2, is a ring 8, and extending through the flange 7, wall of the tank, and ring 8 are bolts 9 whereby the parts are firmly clamped together so that a water tight joint is produced. The outer end of the induction tube 5 is preferably flush with the rim 7, and the space inclosed by the member 6 forms an air inlet chamber 10 that communicates with the induction tube through a plurality of openings 11 whereby air is drawn into the induction tube by the burner flame passing forcibly into the drum 3, so that sufficient air will be supplied to enable complete combustion of the fuel. The induction tube 5 also serves to support the end of the drum 3 to which it is attached, and the opposite end of the drum rests on the bottom of the tank by means of a leg 12.

The burner of the heating apparatus comprises a casting 13 provided with a nozzle 14, a tubular neck 15, a starting cup 17 and a threaded boss 18 for receiving the needle valve 19. The tubular neck has its extremity threaded so as to screw into a member 20 that constitutes a combined vaporizer and flame conductor. The needle valve 19 controls communication between the passages 21 and 22 of the nozzle 14 and neck 15, respectively, so that the supply of gas, and hence the volume of the flame, can be controlled. The starting cup 17 is of any approved construction and is adapted to receive enough fuel to intensely heat the burner during the starting of the apparatus.

The member 20 is preferably a suitably shaped casting to fit into the outer end of the induction tube 5, and is of considerable mass so as to retain its temperature after being once highly heated. This member 20 is provided with longitudinal passages 23 extending inwardly to a point short of its inner end and are connected by a transverse passage 24 bored from one side and closed at its outer end by a screw plug 25. These passages 23 and 24 constitute a vaporizing conduit for vaporizing the liquid hydro-carbon before passing to the burner. The neck 15 of the burner is connected with one of the passages 23 while the other passage is connected with the fuel supply pipe 26. The member 20 is provided with the flame conducting passage 27 that extends from end to end thereof in line with the nozzle 14 of the burner and is tapered in one direction. The inlet end of the passage 27 is spaced from the nozzle 14, so that the jet of vapor discharged by the nozzle will draw in a supply of air from the atmosphere. Combustion takes place in the passage 27 so that the member 20 becomes highly heated and causes the fuel passing through the vaporizer conduit to be turned into vapor. The burning mixture of air and vapor passes out of the passage 27 into the induction tube 5 and thereby receives a fresh supply of air through the openings 11 so that complete combustion takes place in the heating drum 3. The heat that radiates from the member 20 and induction tube 5 serves to warm the currents of air that are sucked in through the openings 11, so that comparatively little energy is wasted. The member 20 is removably fitted within the induction tube and the burner 13 is supported wholly on the said body. This feature of the device is of advantage for the reason that the burner and combined vaporizer and flame conductor can be removed from the tank during the seasons when the water does not require heating, and the detaching of the parts is accomplished very readily.

The fuel supply system comprises a tank 28 in which is contained any suitable liquid hydrocarbon maintained under a suitable head. This head is preferably obtained by means of air under the desired pressure, and for this purpose a hand operated air pump 29 is provided which connects with the fuel supply pipe 26 through the pipe 30. The fuel pipe 26 extends downwardly through the top of the tank or fuel reservoir 28 to a point adjacent the bottom thereof. When it is desired to establish an air pressure in the tank, the needle valve 19 is closed and the pump 29 operated. Air is thus discharged through the pipe 30 and the portion of the fuel supply pipe 26 leading into the fuel reservoir, and the air thus discharged passes into the reservoir and rises through the fuel and collects at the top of the reservoir. When the desired pressure is obtained, the valve 31 of the pipe 30 is closed so as to prevent leakage through the pump 29. The apparatus is now in condition for operation and all that is required is to heat the burner 13 by means of the starting cup 17 and then open the needle valve. The vapor that is generated in the passage 22 by the starting cup flame is ignited as it passes out of the nozzle, and the flame enters the member 20 so that vapor will be generated in the vaporizer passage to maintain the burner flame. The fuel supply pipe 26 is arranged to support the air pump and also the combined vaporizer and flame conductor 20, and as the fuel supply pipe is connected with and supported on the fuel reservoir, the tank or reservoir, the air pump, the fuel supply pipe, burner, and member 20 constitute a unit or unitary structure which is removable from the water tank 1 simply by pulling out the member 20 from the induction tube 5. The advantage of this is apparent, since the attachment of the burner system with the tank at the beginning of the cold weather season, or the detachment of the system from the water tank at the end of such season can be accomplished without tools and with a minimum of labor.

From the foregoing description, taken in connection with the accompanying drawing, the advantages of the construction and of the method of operation will be readily apparent to those skilled in the art to which the invention appertains, and while we have described the principle of operation of the invention, together with the apparatus which we consider to be the best embodiment thereof, we desire to have it understood that the apparatus shown is merely illustrative, and that various changes may be made, when desired, as are within the scope of the claims.

What is claimed is:—

1. In an apparatus of the class described, the combination of a liquid containing tank, a heating chamber submerged therein, an induction tube provided with an integral hollow cup-shaped member extending through an opening in the wall of the tank and forming an air chamber communicating with the induction tube, means for securing the member to the wall and forming a water tight joint, and a burner discharging its flame into the induction tube.

2. In an apparatus of the class described, the combination of a liquid containing tank, a heating device submerged therein, an induction tube connected with the device and provided with an integral cup-shaped member extending through an opening in the wall of the tank and formed with a rim bearing on the outside of the wall, a ring surrounding the member and bearing on the inside of the wall, bolts extending through the said rim and ring and through the wall to secure the parts together, said induction tube being provided with openings communicating with the hollow of the cup-shaped member to receive atmospheric air therefrom, and a burner arranged to direct its flame into the induction tube.

In testimony that we claim the foregoing as our own, we have hereto affixed our signatures in the presence of two witnesses.

CARL N. NELSON.
NICHOLAS A. LEE.

Witnesses:
PERENCE TOYCEN,
PETER PETERSON.